INVENTOR.
THOMAS CASE
BY
[signature]
ATTORNEY

INVENTOR.
THOMAS CASE
BY Isidore Togut
ATTORNEY

June 1, 1965

T. CASE 3,187,202

PULSE-COUNT CONTROL CIRCUIT WHEREIN THE INPUT IS SAMPLED AND
INHIBITED UPON INPUT EXCEEDING PREDETERMINED FREQUENCY

Filed Oct. 25, 1962

INVENTOR.
THOMAS CASE
BY
ATTORNEY 3,187,202

PULSE-COUNT CONTROL CIRCUIT WHEREIN THE INPUT IS SAMPLED AND INHIBITED UPON INPUT EXCEEDING PREDETERMINED FREQUENCY

Thomas Case, Yonkers, N.Y., assignor to International Telephone and Telegraph Corporation, Nutley, N.J., a corporation of Maryland Filed Oct. 25, 1962, Ser. No. 232,957
9 Claims. (Cl. 307—88.5)

This invention relates to pulse counting circuits and more particularly to a pulse count control circuit for limiting the pulse density.

In transponders, such as are used in aircraft for air-to-air navigation information, pulses received by the aircraft from other aircraft are used to trigger the modulator to transmit reply pulses. The modulators are designed to operate at a certain pulse density or pulse frequency and if this pulse density is exceeded as may occur when a large number of aircraft are simultaneously transmitting pulses, then the modulator is overloaded and will cause failure of the transmitter. It is therefore desirable and necessary to provide a circuit for limiting the pulse density of received pulses to the pulse forming circuit of the modulator.

An object of this invention is therefore to provide a pulse count control circuit which will limit the pulse input to a desired amount.

Another object is to provide a pulse count control circuit which will average out the number of pulses over a period of time so that the pulse density will not exceed a desired limit.

A feature of this invention is a pulse count control circuit which is responsive to a source of pulses and includes means to sample the pulses and to set a reference pulse count rate level. If the reference pulse count rate level is exceeded, a control pulse is generated which initiates a gate and this gate permits a control pulse to inhibit the pulse input during a predetermined time interval.

Another feature of this invention is that the gate circuit is a monostable circuit which will provide a gate for a predetermined time during which the pulse input will be inhibited.

The above-mentioned and other features and objects of this invention will become more apparent by reference to the following description taken in conjunction with the accompanying drawings, in which.

Figures 1, 2:
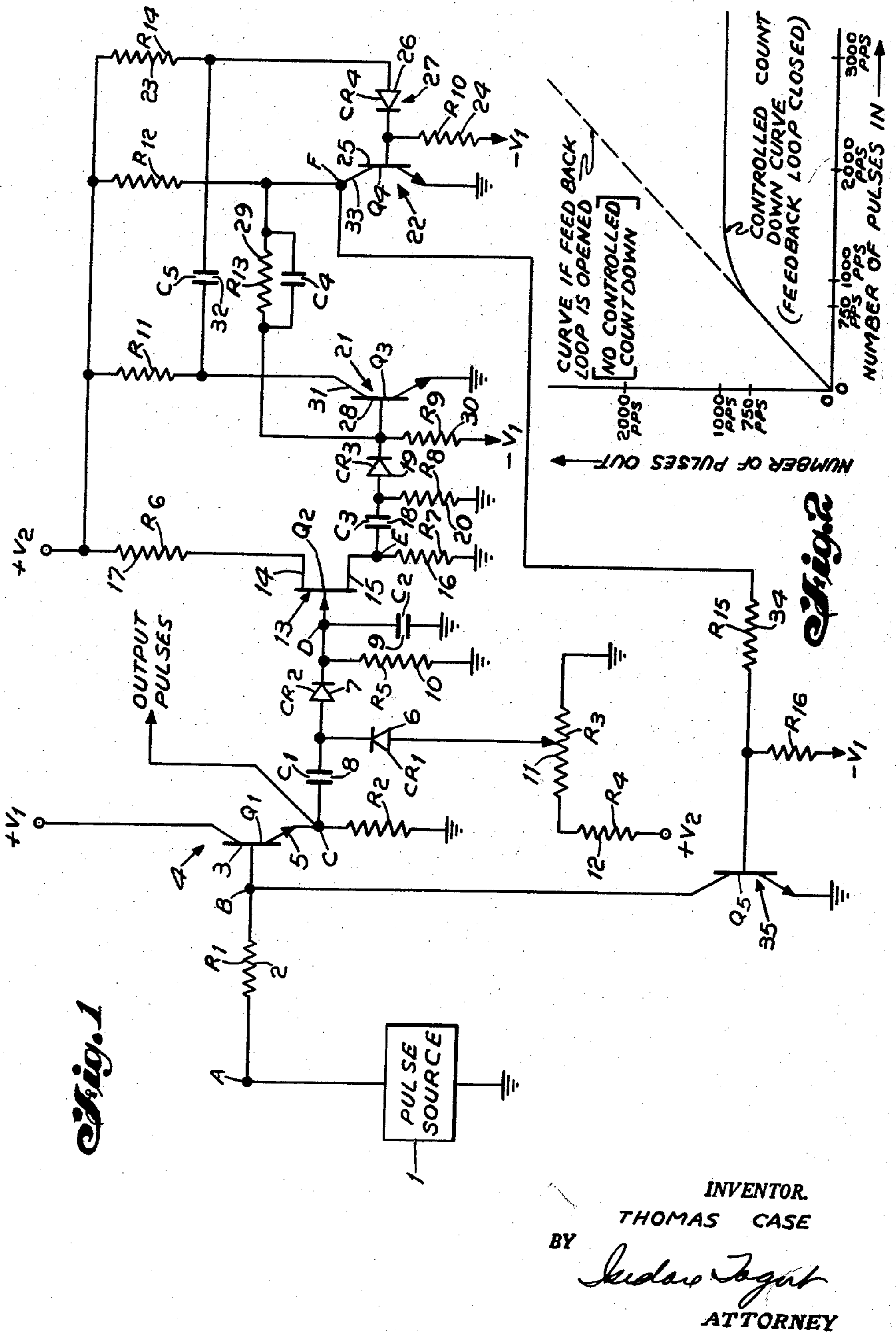
FIGURE 1 is a schematic diagram of the pulse count control circuit of this invention.
FIGURE 2 is a graph of the desired characteristic of the pulse count control circuit of this invention.

With reference to the figures, there is shown in the schematic diagram a source of pulses 1 coupled by a resistor 2 to the base 3 of a first transistor 4. The normal output pulses appearing at the emitter 5 of transistor 1 are also the same pulses to be controlled. These pulses are fed to a two diode pulse sampling circuit which comprises diodes 6 and 7 in series, capacitor 8, which couples the input pulses to the junction of the diodes 6 and 7, capacitor 9 and resistor 10 in parallel which couple the cathode of diode 7 to ground. It also comprises a countdown adjustment potentiometer 11, the wiper of which is coupled to the anode of diode 6, and resistor 12 which couples one end of the potentiometer to a source of voltage. The operation of this portion of the circuitry is as follows. We assume that initially no charge exists on either capacitor 8 or 9. When the first pulse appears at the emitter junction 5 of transistor 4, it will cause capacitor 8 to be charged through the diode 6. For proper operation, the time constant of capacitor 8 times the total series resistance consisting of the diode 6 forward resistance, the emitter follower 5 generator impedance and the Thevenin equivalent resistance of resistor 12 and potentiometer 11 must be small in comparison with the pulse width of the input pulse. During the time that capacitor 8 is still being charged by the input pulse, the diode 7 is back biased and hence, cannot conduct; thus, the capacitor 9 at the moment remains without a charge on it. At the termination of the input pulse, however, capacitor 8 is left with a net charge which now appears across the diode 7 and the capacitor 9. At this time, the diode 6 is held back biased so that the capacitor 8 will discharge through the diode 7 into capacitor 9. Equilibrium is reached when the two capacitor voltages are equal. The time during which this transfer of energy takes place from capacitors 8 into capacitor 9 must be small compared with the input pulse spacing in order to again allow equilibrium to be established. In order to have proper pulse sampling characteristics, capacitor 9 must act as a long term storage element and hence, must be larger in value than capacitor 8. Therefore, the voltage change across capacitor 9 will be small compared to the value of the input pulse developed across the capacitor 8. The next pulse that follows will restore the charge on capacitor 8 and on the termination of this pulse, will again discharge through diode 7 into capacitor 9. Thus, capacitor 9 will receive another charge on it for each input pulse till it reaches the voltage level at which firing of the next stage occurs if the pulse input exceeds the pulse count rate level. The voltage build-up across capacitor 9 is fed to a unijunction transistor 13. The operation of the unijunction transistor depends upon its intrinsic standoff voltage ratio which is a function of the ratio of its internal base 14 resistance to its internal base 15 resistance. If the value of voltage on capacitor 9 is below the intrinsic standoff voltage threshold value, then unijunction transistor 13 remains in a quiescent "off" state. As soon as a charge on capacitor 9 equals or exceeds this threshold point, the unijunction transistor input emitter to base 15 junction breaks down allowing capacitor 9 to discharge through Q2 emitter to base 15 junction into resistor 16. This rapid discharge of capacitor 9 causes a positive high current pulse to be developed across resistor 16. Resistor 17 appearing in the base 14 lead of the unijunction transistor 13 is required for temperature compensation of the unijunction transistor 13 internal parameters. The positive pulse just developed across resistor 16 is used to initiate the positive gate approximately15 milliseconds in duration which is a gate voltage signal used for feedback control. The operation of the monostable circuit which makes this 15 millisecond gate will now be explained.

The components, capacitor 18, diode 19 and resistor 20 provide a means for triggering the monostable multivibrator which comprises transistor 21 and transistor 22 with the associated circuitry to be described. Normally, transistor 22 is conducting and transistor 21 is non-conducting. The current supplied by resistor 23 is divided between two elements, resistor 24 and the base 25 of transistor 22. Resistor 23 supplies the necessary current to keep transistor 22 in its normally "on" state. In this state, the base 25 of transistor 22 is approximately +0.7 volt above ground and the anode side 26 of diode 27 is approximately at +1.4 volts above ground. Resistor 24 provides a collector to base leakage path for transistor 22 in high temperature operation. The base 28 of transistor 21 is held negative by the voltage division of resistors 29 and 30 which keeps transistor 21 in the non-conducting state. Resistor 30 also serves to provide a leakage path for collector-to-base leakage of transistor 21 in high temperature operation. Whenever a pulse appears across resistor 16, it is coupled to capacitor 18 into the base 28 of transistor 21 turning that transistor "on." This causes the collector 31 of transistor 21 to fall from approximately plus 22 volts D.C. to approximately ground level. This sudden change of voltage is coupled through capacitor 32 over to the base 25 of transistor 22 turning it "off." At this instant, the collector 33 of transistor 22 jumps to approximately 22 volts D.C. and remains at this level for its timing period 15 milliseconds which is determined primarily by the value of resistor 23 and capacitor 32. This gate, approximately 15 milliseconds in width, is the actual control gate which is fed to the control switch transistor 35. The operation of transistor 33 is basically that of an "on" and "off" switch. This 15 millisecond gate supplies a current through resistor 34 which turns transistor 35 "on," saturating it for 15 milliseconds. With transistor 35 in saturation, an effective short circuit is placed between the point B at the base 3 of transistor 4 and ground through the collector-emitter junction of transistor 35. The normal input pulses which appear at point A, as shown in the waveform graphs, are now shorted out at point B. Emitter follower transistor 4 during this 15 millisecond time interval is also effectively "shut off" or disconnected from the two diode counter described above. No output pulses in this time can appear at the emitter 5 of transistor 4, point C on the waveform graph, since point C follows exactly the condition that exists at point B. At the termination of the 15 millisecond gate, transistor 35 turns "off," thus removing the short circuit appearing at point B, the base of transistor 4. Thus, the normal pulses appearing at point A now appear at points B and C. The two diode pulse sampler is now effectively back in the circuit and the complete cycle repeats.

The desired curve for limiting the transmitter pulses to some fixed pulse density above some specified repetition rate is shown in FIG. 2. The broken line represents the curve when the feedback loop is open. The full line represents the desired controlled countdown curve with the feedback loop closed.

Figure 3:
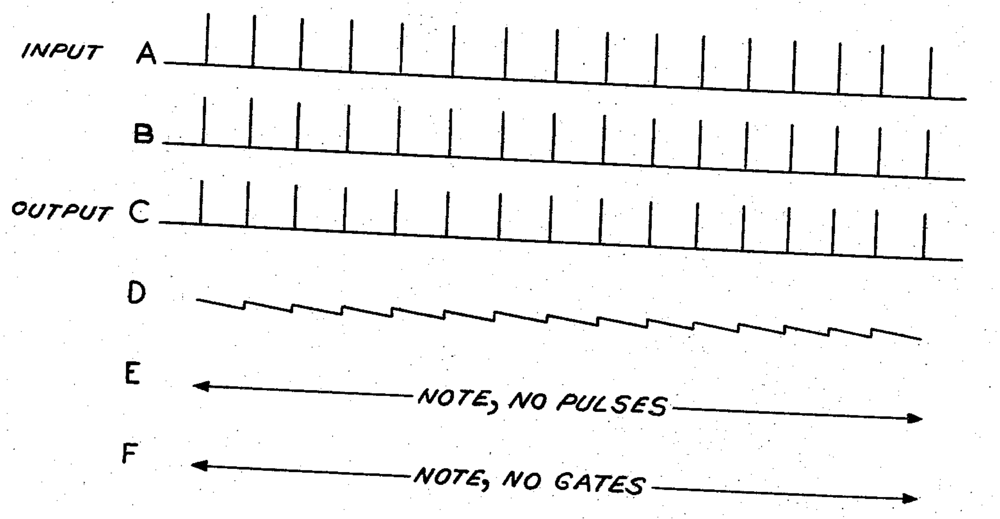
FIGURES 3 and 4 are waveforms useful in explaining the theory and operation of this invention.
Figure 4:
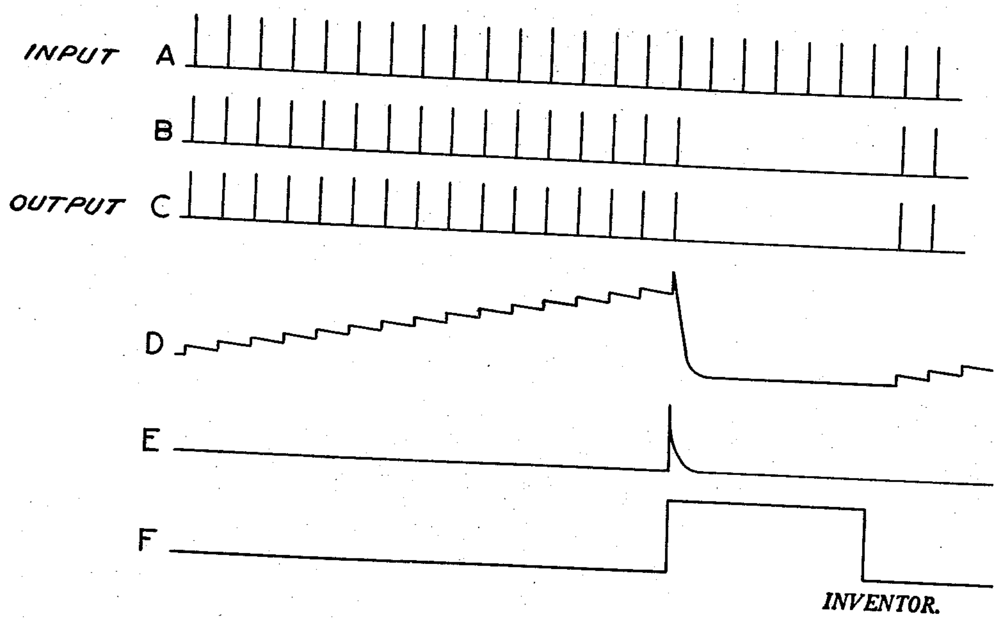

Since the countdown cycle is presumably set at approximately 750 pulses per second, if the input pulses appearing at point A shown in FIGURE 3 remain below this number of pulses per second, then no countdown control will occur, and points B and C will thus have the same shape and number of pulses as appeared at point A. The charging of capacitor 9, as shown in waveform D, FIG. 3, is at the same level and no pulse will occur at point E and no gate F will be initiated by the monostable circuit. If the pulses at point A go above 750 p.p.s., as shown in FIGURE 4, the two diode pulse sampling circuit will sample this increase in pulse number and initiate the course of events described above. If the pulse sampling count is equal to or below the pulse count rate level of the pulse sampling circuit, then the charge on capacitor 9 caused by a pulse dissipates before the next pulse arrives and the charge does not exceed the level shown in waveform D, FIG. 3. If the pulse input exceeds the pulse count rate level, then the time between pulses is too short for the charge on capacitor 9 to completely dissipate and the residual charges caused by the succeeding pulses build up to the voltage level shown in waveform D, FIG. 4, until the triggering level is reached. As shown in FIGURE 4, pulses at B and C occur at the same rate as at A up to the point when the capacitor 9 charges, as shown in waveform D, to above the threshold point and then a discharge of capacitor 9 through the unijunction transistor 13 emitter to the base 15 junction in the pulse form shown in waveform E triggers the monostable circuit to initiate the gate shown in FIGURE F. During the period of this gate, the input pulses at B are shut off and no output pulses occur at point C.

This circuit has been reduced to practice and successfully tested. The circuit parameters are as follows:

| | | | |
|---|---|---|---|
| C1 | Capacitor | μfarads | .0033 |
| C2 | Capacitor | do | .22 |
| C3 | Capacitor | do | .1 |
| C4 | Capacitor | μμf | 180 |
| C5 | Capacitor | μfarads | .22 |
| CR1 | Diode | | 1N459 |
| CR2 | Diode | | 1N459 |
| CR3 | Diode | | 1N459 |
| CR4 | Diode | | 1N459 |
| Q1 | Transistor | | Type 2N1893 |
| Q2 | Transistor | | Type 2N491 |
| Q3 | Transistor | | Type 2N338 |
| Q4 | Transistor | | Type 2N338 |
| Q5 | Transistor | | Type 2N1893 |
| R1 | Resistor | ohms | 3.3K |
| R2 | Resistor | do | 18K |
| R3 | Variable resistor | do | 10K |
| R4 | Resistor | do | 2.2 |
| R5 | Resistor | do | 250K |
| R6 | Resistor | do | 470 |
| R7 | Resistor | do | 390 |
| R8 | Resistor | do | 330K |
| R9 | Resistor | Megohms | 2.2 |
| R10 | Resistor | do | 2.2 |
| R11 | Resistor | ohms | 10K |
| R12 | Resistor | do | 10K |
| R13 | Resistor | do | 47K |
| R14 | Resistor | do | 82K |
| R15 | Resistor | do | 15K |
| R16 | Resistor | Megohm | 1 |

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse count control circuit responsive to a source of pulses comprising:
input means, output means coupled to said input means,
means coupled to said input means to sample the pulses,
means coupled to said sampling means to set a reference pulse count rate level,
means coupled to said sampling means and responsive to the pulse input exceeding the reference count rate level to generate a control pulse;
and means coupled to said control pulse generating means and responsive to said control pulse to inhibit the pulse input during a predetermined time interval whereby the pulse output at said output means is maintained at a rate not exceeding said reference pulse count rate.

2. A pulse counte control circuit responsive to a source of pulses comprising:
input means,
output means coupled to said input means,
means coupled to said input means to sample the pulse frequency,
means coupled to said sampling means to set a reference pulse count rate level,
means coupled to said sampling means to generate a control pulse when the reference count rate level is exceeded by said pulse input,
gating means coupled to said pulse generating means and responsive to said control pulse to initiate a gating pulse for a predetermined time, and
means coupled to said gating means and responsive to said gating pulse to inhibit the pulse input during said predetermined time whereby the pulse output at said output means is maintained at a level not exceeding said reference pulse count rate.

3. A pulse count control circuit responsive to a source of pulses comprising:
input means,
output means coupled to said input means,
means coupled to said input means to sample the pulse frequency,
means coupled to said sampling means to set a reference pulse count rate level,
means coupled to said sampling means to generate a control pulse when the reference pulse count rate level is exceeded by said pulse input,
a monostable circuit coupled to said generating means and responsive to said control pulse to initiate a gating pulse for a predetermined time, and
means coupled to said monostable circuit and responsive to said gating pulse to inhibit the pulse input during said predetermined time whereby the pulse output at said output means is maintained at a level not exceeding said reference pulse count rate.

4. A pulse count control circuit responsive to a source of pulses comprising:
input means,
output means coupled to said input means,
means coupled to said input means to sample the pulse frequency,
means coupled to said sampling means to set a reference pulse count rate level,
means coupled to said sampling means to generate a control pulse when the reference pulse count rate level is exceeded by said pulse input,
a gate circuit coupled to said generating means and responsive to said control pulse to initiate a gate for a predetermined time, and
a feedback circut coupled to said gate circuit and responsive to said gate to inhibit the pulse input during said predetermined time whereby the pulse output at said output means is maintained at a level not exceeding said reference pulse count rate.

5. A pulse count control circuit responsive to a source of pulses comprising:
input means,
output means coupled to said input means,
means coupled to said input means to sample the pulse frequency, the time constants of said sampling means determining a reference pulse count rate level,
means coupled to said sampling means to generate a control pulse when the reference pulse count rate is exceeded by said pulse input,
a gating circuit coupled to said generating means responsive to said control pulse to initiate a gate for a predetermined time,
and a feedback circuit coupled to said gating circuit and responsive to said gating pulse to inhibit the pulse input during said predetermined time whereby the pulse output at said output means is maintained at a level not exceeding said reference pulse count rate.

6. A pulse count control circuit responsive to a source of pulses comprising:
input means,
output means coupled to said input means,
means coupled to said input means to sample the pulse frequency,
said sampling means including first and second diodes coupled in series, and impedance means coupled to said first and second diodes, said sampling means having a time constant which determines the reference pulse count rate level,
means coupled to said sampling means to generate a control pulse when the reference pulse count rate level is exceeded,
gating means coupled to said generating means and responsive to said control pulse to initiate a gate for a predetermined time, and
a feedback circuit coupled to said gating means and responsive to the duration of said gate to inhibit the pulse input during said predetermined time whereby the pulse output of said output means is maintained at a level not exceeding said reference pulse count rate.

7. A pulse count control circuit according to claim 6 wherein the means to generate a control pulse include a capacitor coupled to said second diode and said capacitor is charged to a voltage which exceeds a threshold voltage level when said reference pulse count rate is exceeded.

8. A pulse count control circuit according to claim 7 wherein said feedback circuit includes a transistor coupled to the input of said pulse control circuit and said transistor is placed in the conducting state during the duration of said gate to inhibit the pulse input to said circuit.

9. A pulse count control circuit responsive to a source of pulses comprising
a first transistor,
means coupling said pulse source to the base of said transistor,
a pulse sampling circuit including first and second diodes coupled in series,
a variable resistor coupled to said first diode and a first resistor and a first capacitor coupling the cathode of said second diode to ground, the constants of said sampling circuit determining a reference pulse count rate, whereby when the input pulses exceed said reference pulse count rate the charge on said first capacitor exceeds a predetermined level,
a second capacitor coupling the emitter of said first transistor to the junction of said first and second diodes,
means coupling the output of said pulse count control circuit to the emitter of said first transistor,
a second transistor,
means coupling the output of said pulse sampling means to the input emitter of said second transistor when the charge on said first capacitor exceeds the predetermined level,
a gating circuit comprising third and fourth transistors,
means coupling the output of the anode of said second transistor to the base of said third transistor,
means coupling the base of said third transistor to the collector of said fourth transistor,
means coupling the collector of said third transistor to the base of said fourth transistor,
a fifth transistor,
means coupling the collector of said fourth transistor to the base of said fifth transistor,
means coupling the collector of said fifth transistor to the base of said first transistor, and
means coupling the emitter of said fifth transistor to ground whereby when said fifth transistor is placed in the conducting state in response to an output from said gating circuit said first transistor is placed in a non-conducting state during the duration of the gate and no output is derived from the pulse count control circuit.

References Cited by the Examiner

UNITED STATES PATENTS 3,149,243 9/64 Garfield ------------- 307—88.5

ARTHUR GAUSS, *Primary Examiner.*